UNITED STATES PATENT OFFICE.

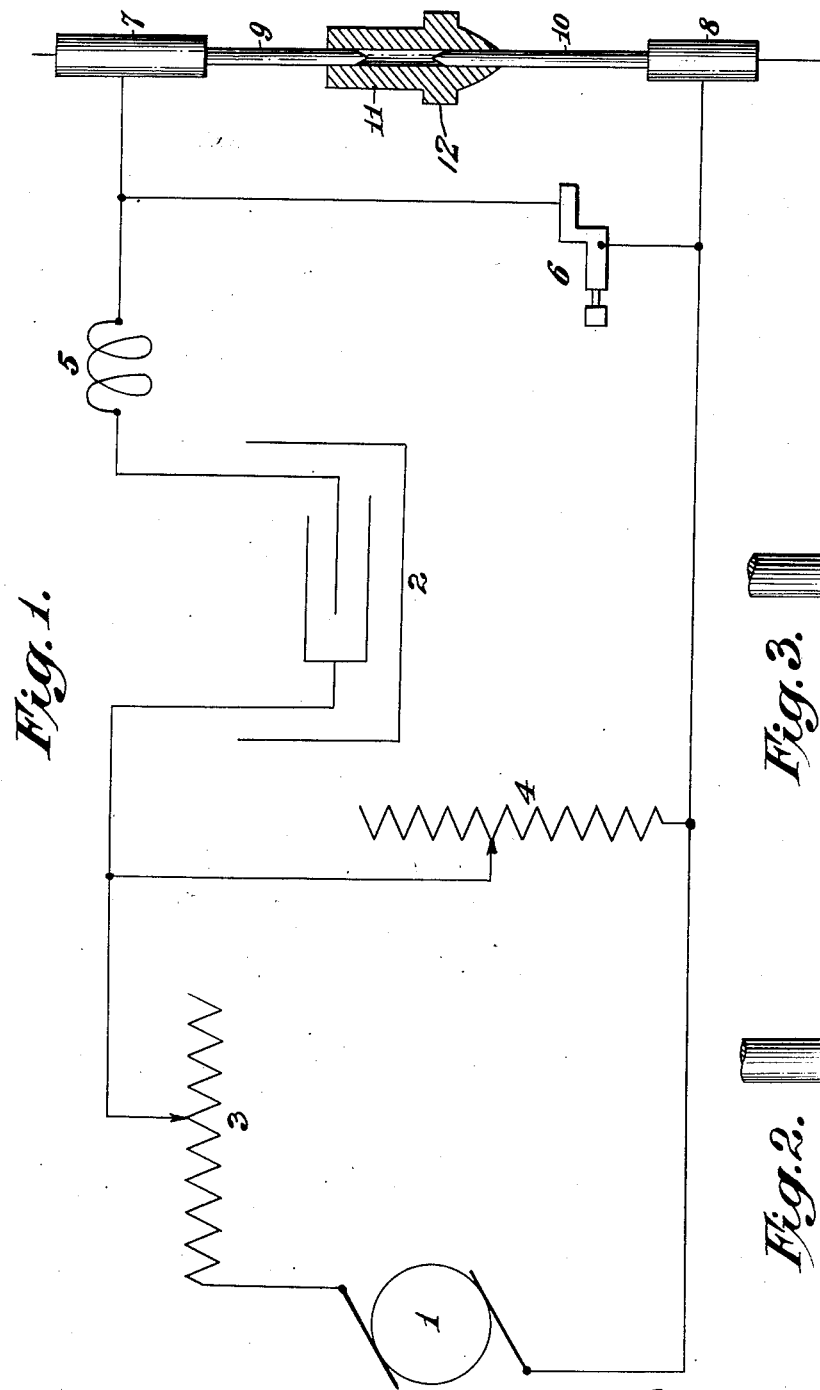

FRANK L. DYER, OF MONTCLAIR, NEW JERSEY.

METHOD OF MANUFACTURING SPARK-PLUGS.

1,299,150.  Specification of Letters Patent.  Patented Apr. 1, 1919.

Application filed August 16, 1918. Serial No. 250,116.

*To all whom it may concern:*

Be it known that I, FRANK L. DYER, a citizen of the United States, residing at Montclair, in the county of Essex and State of New Jersey, having a post-office address at No. 55 Liberty street, New York city, New York, have invented certain new and useful Improvements in Methods of Manufacturing Spark-Plugs, of which the following is a specification.

My invention relates to various new and useful improvements in methods of manufacturing spark plugs. In applications for Letters Patent of the United States, filed April 27, 1917, Serial No. 164,849, and Jan. 24, 1918, Serial No. 213,670, I disclose improvements in spark plugs wherein the central electrode or conductor is secured within the porcelain by a process of electric welding. I suggest in said applications a method analogous to butt welding, that is to say, two wire sections (preferably steel and nickel, respectively) are pressed together end to end within the porcelain, being heated by a suitable current of low voltage whereby the abutting ends will be brought to a condition of plasticity, the continued pressure effecting a welding of the two sections and a simultaneous extrusion of plastic metal which forms a tight seal between the resulting composite electrode and the porcelain. I find in practice that when the metal sections are thus united by butt welding, the entire length of the metal sections within the porcelain is brought to a high temperature and in consequence the porcelain is quite severely heated and unless the operation is carried on with considerable care, there is a likelihood of the porcelain being cracked and broken. Furthermore, with a butt welding process the operation is relatively slow, requiring at best several seconds to effect the weld.

I now find that superior results can be secured by effecting the welding of the metal sections within the porcelain by a process of percussion welding, by which I mean that process in which the wires to be joined having suitably reduced ends are forcibly brought together and simultaneously by their contact permit the discharge of a condenser, whereby a powerful current will be discharged momentarily through the metal sections and by reason of the reduced area of contact an intense localized heating at the point of contact will take place, resulting in the making of a very perfect weld between the metal sections and in the substantial extrusion of the metal at the weld to produce the desired seal between the composite electrode thus secured and the porcelain. This welding of the metal sections takes place in a minute fraction of a second, and although the heat developed is, of course, intense, it is confined to the neighborhood of the weld and is readily taken care of by conduction to the unheated section of the wire and to the unheated porcelain. As a result, I encounter in practice none of the difficulties due to the severe heating of the porcelain which I have experienced in connection with butt welding. Furthermore, by the process of percussion welding I secure apparently a better weld between dissimilar metals, such as steel and nickel, and a more certain weld than I have been able to obtain by butt welding.

In order that my invention may be better understood, attention is directed to the accompanying drawings which form a part of this specification and in which—

Figure 1 is a diagrammatic view of conventional circuits for a percussion welding method applied to the manufacture of a spark plug of the type disclosed in my said application for Letters Patent.

Fig. 2, a view of one of the metal electrodes illustrating the same as being formed with a reduced diametric edge adapted to engage at right angles the corresponding diametric edge on the other metal section to provide the desired reduced contact area, and Fig. 3, a corresponding view illustrating the bringing of the metal sections almost to a point to secure the desired reduced area of contact. In these views corresponding parts are represented by the same reference numerals.

The circuit arrangement shown in Fig. 1 is taken from an article entitled "Percussive welding" in the *Electric Journal* for 1914, Volume XI, page 640, to which reference is made for an understanding of the method of percussion welding to which I herein refer, but it will, of course, be understood that other circuit arrangements may be employed suitable for the purpose as may be disclosed in the literature relating to the art of percussion welding. Any method in which there is a momentary but very powerful electric discharge through engaging edges or points or surfaces of the metal sections when they are brought into percussive contact whereby a practically instantaneous welding operation takes place, I regard as coming within the definition of percussion welding.

With the circuit shown, 1 is a generator, 2, a condenser, shown as an electrolytic condenser, 3, a high resistance for voltage adjustment, 4, a second voltage adjustment resistance, 5, an inductance of from two to ten turns, 6, a spring switch with carbon contacts and 7 and 8 suitable electrodes or clamps to which the work is secured. Carried by these electrodes are the metal sections 9 and 10, the former being preferably steel and the latter preferably nickel. These metal sections are brought percussively together within the porcelain 11 by causing the electrode 7 to drop the prescribed distance and with the prescribed impact to give the desired percussion effect, these factors as well as the constants of the circuit being determined by experiment to secure the best results. The nickel section 10 is so proportioned in length as to cause the weld to be formed preferably at a point within the porcelain coinciding with the enlargement 12 for the obvious reason that it is desirable to form the weld at the point where the porcelain is strongest and where its heat conductively is greatest. The desired smallness of contact area can be secured in many ways. For instance, in Fig. 2, I illustrate the metal sections as being formed with a diametric edge 15, such an edge as would be produced for example by an ordinary wire cutter, the metal sections being so disposed that the two edges are crosswire. In Fig. 3, I show the metal sections as being brought almost to a point 14 so that when the sections are brought together these small areas will come into percussive contact. I prefer to use the arrangement of Fig. 2 owing to the ease with which it may be formed and to the certainty that the edges will strike one another in operation. With the apparatus arranged as shown, it is only necessary to elevate the electrode 7 to the desired distance and permit it to drop, bringing the metal sections into percussive contact. This permits the condenser 2 to discharge and a relatively large current will momentarily pass through the metal sections. When the two metal sections come in contact, an intense arc is apparently formed (assisted perhaps by the fact that there may be a slight rebound of the metal sections) and the heat thus developed very perfectly welds the two sections together while at the same time the metal extruded by the pressure forms a tight seal with the porcelain and locks the resulting composite electrode rigidly within the porcelain.

Having now described my invention what I claim as new therein and desire to secure by Letters Patent is as follows:

1. The method of securing two metal sections within a spark plug porcelain which consists in welding said sections *in situ* by percussion welding, substantially as and for the purposes set forth.

2. The method of securing two metal sections within a spark plug porcelain which consists in welding said sections *in situ* by percussion welding, the pressure being sufficient to cause the metal extruded by the weld to form a tight seal with the porcelain, substantially as and for the purposes set forth.

This specification signed and witnessed this fifteenth day of August, 1918.

FRANK L. DYER.

Witnesses:
 ABRAHAM FASTONE,
 CORA B. WRIGHT.